United States Patent
Clarke et al.

(10) Patent No.: US 9,108,349 B2
(45) Date of Patent: Aug. 18, 2015

(54) PROFILED EXTRUSION REPLICATION

(75) Inventors: Graham M. Clarke, Woodbury, MN (US); Patricia A. Eull, Mahtomedi, MN (US); Kenneth A. Peterson, White Bear Lake, MN (US); David F. Slama, City of Grant, MN (US); Lee E. Olsen, Stillwater, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 423 days.

(21) Appl. No.: 13/636,278

(22) PCT Filed: Mar. 21, 2011

(86) PCT No.: PCT/US2011/029169
§ 371 (c)(1),
(2), (4) Date: Oct. 5, 2012

(87) PCT Pub. No.: WO2011/126713
PCT Pub. Date: Oct. 13, 2011

(65) Prior Publication Data
US 2013/0037987 A1 Feb. 14, 2013

Related U.S. Application Data

(60) Provisional application No. 61/319,012, filed on Mar. 30, 2010.

(51) Int. Cl.
*B29C 47/14* (2006.01)
*B29C 43/22* (2006.01)
(Continued)

(52) U.S. Cl.
CPC .............. *B29C 43/222* (2013.01); *B29C 43/24* (2013.01); *B29C 47/003* (2013.01);
(Continued)

(58) Field of Classification Search
CPC .............. B29C 47/0021; B29C 47/003; B29C 47/0061; B29C 47/0837; B29C 47/0828; B29C 47/14; B29C 47/38; B29C 43/222; B29C 43/24; B29C 2043/263
USPC ......... 264/177.1, 210.1, 210.2; 425/224, 369, 425/370, 371, 373, 112, 113
See application file for complete search history.

(56) References Cited

U.S. PATENT DOCUMENTS

| 3,676,242 A | 7/1972 | Prentice |
| 4,842,794 A | 6/1989 | Hovis |

(Continued)

FOREIGN PATENT DOCUMENTS

| CN | 101445665 | 6/2009 |
| DE | 1 660 230 | 4/1971 |

(Continued)

OTHER PUBLICATIONS

Supplemental European Search Report (date of completion of the search Nov. 6, 2014), 6 pages.

*Primary Examiner* — Joseph S Del Sole
*Assistant Examiner* — Lawrence D Hohenbrink, Jr.
(74) *Attorney, Agent, or Firm* — Gregory D. Allen

(57) ABSTRACT

A profiled extrusion replication process is disclosed that includes steps of (a) extruding a molten material through an extrusion die having at least one profiled die lip to form a molten extrudate having first and second major extrudate surfaces and having a first structural feature in the first major extrudate surface; (b) bringing the molten extrudate into contact with a tool surface comprising one or more second structural features so as to cause a portion of the first structural feature in the first major extrudate surface to contact the one or more second structural features on the tool surface; and (c) cooling the molten extrudate to provide the structured film. Structured films and apparatus for making structured films are also disclosed.

13 Claims, 9 Drawing Sheets

(51) Int. Cl.
   *B29C 43/24*   (2006.01)
   *B29C 47/00*   (2006.01)
   *B29C 47/32*   (2006.01)
   *B29C 43/46*   (2006.01)
   *B29L 7/00*    (2006.01)

(52) U.S. Cl.
   CPC ............ *B29C 47/0021* (2013.01); *B29C 47/14* (2013.01); *B29C 47/32* (2013.01); *B29C 2043/463* (2013.01); *B29C 2043/468* (2013.01); *B29C 2947/92704* (2013.01); *B29C 2947/92923* (2013.01); *B29L 2007/008* (2013.01)

(56) References Cited

U.S. PATENT DOCUMENTS

| | | | |
|---|---|---|---|
| 4,894,060 A | 1/1990 | Nestegard | |
| 5,173,141 A | 12/1992 | Leseman | |
| 5,204,037 A * | 4/1993 | Fujii | 264/171.23 |
| 5,232,777 A * | 8/1993 | Sipinen et al. | 428/364 |
| 5,295,805 A | 3/1994 | Akamatsu | |
| 6,489,003 B1 | 12/2002 | Levitt | |
| 6,659,020 B1 * | 12/2003 | Ball | 108/57.28 |
| 7,195,729 B2 | 3/2007 | Jackson | |
| 2002/0195738 A1* | 12/2002 | Norquist et al. | 264/173.16 |
| 2004/0000743 A1* | 1/2004 | Pawloski | 264/248 |
| 2006/0147686 A1 | 7/2006 | Ausen | |
| 2010/0080940 A1 | 4/2010 | Godey | |

FOREIGN PATENT DOCUMENTS

| | | |
|---|---|---|
| FR | 2912683 | 8/2008 |
| WO | WO 2007/078518 | 7/2007 |

* cited by examiner

PROFILED EXTRUSION REPLICATION

CROSS REFERENCE TO RELATED APPLICATIONS

This application is a national stage filing under 35 U.S.C. 371 of PCT/US2011/029169, filed Mar. 21, 2011, which claims priority to U.S. Provisional Patent application No. 61/319,012, filed Mar. 30, 2010, the disclosure of which are incorporated by reference in their entirety herein.

FIELD

The present disclosure relates to methods for profiled extrusion replication, extrusion replicated films, and an apparatus for profiled extrusion replication.

BACKGROUND

Extrusion replication is a commonly used process in which resin is melted in an extruder, shaped into a molten mass (e.g., a sheet) in a die, and then cast or pressed between two surfaces, such as two rolls or two belts, to form a film.

When rolls are used, one roll typically has a smooth surface, and the second roll frequently has a structured surface. The high nip load between the two rolls forces the melted resin into concave areas in the structured surface. The resulting film bears a negative of the image on the surface of the structured roll. Replicated structures on such films have varying levels of precision dependent on a number of factors used during the extrusion process. Critical variables that influence the level of precision include the temperatures of the melted resin and the two rolls, the nip force applied to the material as it passes between the rolls, and material characteristics of both the rolls and melted resin, including the viscosity of the resin, for example.

Extrusion replication is often concerned with making films that have discrete features on one or both sides. Typically, the films are otherwise substantially planar, having a substantially constant caliper. It is difficult to make films having precisely shaped features that are large in caliper in comparison to an average base thickness. Extrusion replicated films that have a protruding structural feature that is large in comparison to an average base thickness of the film often contain defects such as depressions in the side of the film opposite that of the structural feature, possibly due to incomplete flow of resin into the a replicating tool surface during the formation of the large feature.

SUMMARY

There is a need for additional methods that enable the production of films having precisely shaped features.

According to one exemplary embodiment of the present invention, the process for making a structured film comprises the steps of (a) extruding a molten material through an extrusion die having at least one profiled die lip to form a molten extrudate having first and second major extrudate surfaces and having a first structural feature in the first major extrudate surface; (b) bringing the molten extrudate into contact with a tool surface comprising one or more second structural features so as to cause a portion of the first structural feature in the first major extrudate surface to contact the one or more second structural features on the tool surface; and (c) cooling the molten extrudate to form a structured film.

In a further embodiment of the invention an apparatus for extrusion replication is described, comprising: an extruder equipped with a profiled extrusion die having at least one profiled die lip; and, a tool having a structured surface positioned to receive molten extrudate from the profiled extrusion die.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, an extrudate comprising "a" structural feature can be interpreted to mean that the extrudate includes "one or more" structural features.

As used herein, the term "or" is generally employed in its sense including "and/or" unless the content clearly dictates otherwise. The term "and/or" means one or all of the listed elements or a combination of any two or more of the listed elements.

As used herein, all numbers are assumed to be modified by the term "about" and preferably by the term "exactly." Notwithstanding that the numerical ranges and parameters setting forth the broad scope of the invention are approximations, the numerical values set forth in the specific examples are reported as precisely as possible. All numerical values, however, inherently contain certain errors necessarily resulting from the standard deviation found in their respective testing measurements. Also herein, the recitations of numerical ranges by endpoints include all numbers subsumed within that range (e.g., 1 to 5 includes 1, 1.5, 2, 2.75, 3, 3.80, 4, 5, etc.). Also, a numerical range that includes "up to" a certain value includes that value.

The foregoing summary is not intended to describe every possible embodiment or implementation of the present invention. Those of ordinary skill in the art will gain an understanding of the invention upon review of the remaining sections herein, including the Detailed Description, the non-limiting Examples and the appended claims.

Figure 1:
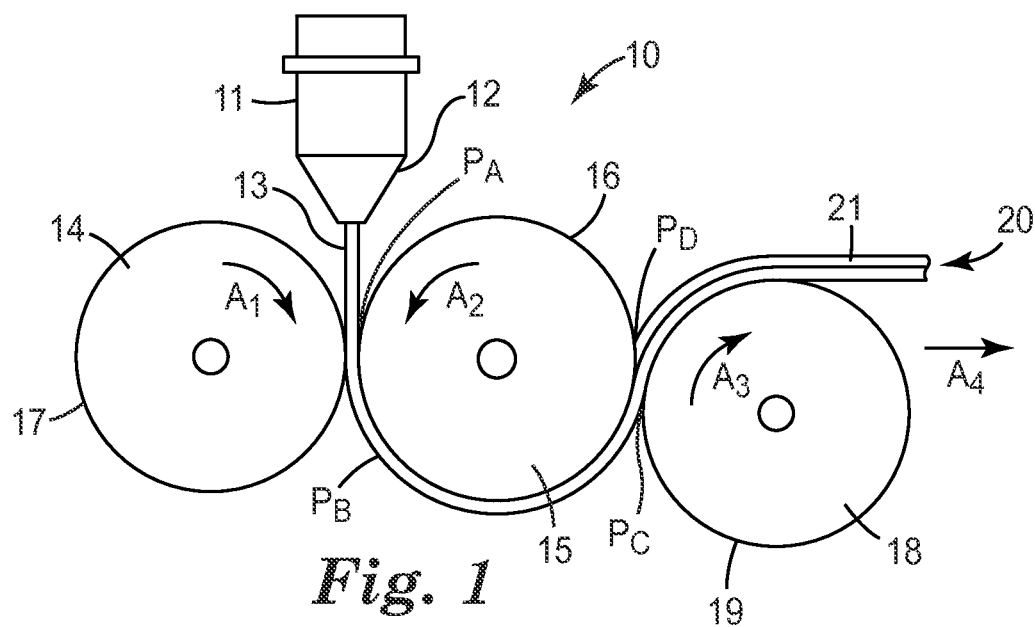
FIG. 1 is a schematic representation of an apparatus for extrusion replication.

In the various figures, reference numerals are used to identify elements of the described embodiments, and like reference numbers typically indicate like elements. Unless otherwise indicated, the figures and drawings in this document are not to scale but are provided solely for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "outward", "inward", "up" and "down", and "first" and "second" may be used in this disclosure, it should be understood that those terms are used in their relative sense only unless otherwise noted. In particular, in some embodiments certain components may be present in interchangeable and/or identical multiples (e.g., pairs). For these components, the designation of "first" and "second" may apply to the order of use, as noted herein (with it being irrelevant as to which one of the components is selected to be used first).

Detailed Description

It will be understood that the terminology employed to describe the various embodiments herein is intended to have meaning consistent with its usage by those of ordinary skill in the art. However, certain terms will be understood to have the specific meanings recited herein.

By "structured surface" it is meant that a surface of an article, including a surface of an extruded material ("extrudate") as well as a surface of a tool, deviates from a substantially planar or other smooth surface. When describing a tool, a structured surface may include features such as grooves, ridges, geometric shapes, other structures, or the like. When used in describing an extruded material, a structured surface may be indicated by the presence of discrete areas of different thicknesses such as extrudate having first and second regions wherein the first region is thicker than the second region, or vice versa. In some embodiments, a structured surface may be described as having at least one thick region and at least one thin region, and the thick regions and thin regions may be interspersed across the surface of the extrudate.

"Molten" is used herein to describe material that is at a temperature above its softening point and having a viscosity low enough to flow under pressure.

Described below are various embodiments of a process that combines steps of (a) extruding a molten material through a profiled die, (b) bringing the molten extrudate into contact with a tool surface comprising one or more structural features, and (c) cooling the extrudate produce a structured film. Exemplary embodiments include an alignment of a structural feature in a major surface of the extrudate with one or more structural features on the tool surface.

FIG. 1 shows a schematic representation of one embodiment of an apparatus 10 for performing an extrusion replication process according to the present invention. Apparatus 10 comprises extruder 11 and profiled die 12 through which a molten resin is extruded as a molten extrudate 13. From die 12, molten extrudate 13 advances to point $P_A$ where the extrudate passes between nip roll 14 rotating in a first direction (as noted by arrow $A_1$) and tool roll 15 rotating in an opposite direction (as noted by arrow $A_2$). At point $P_A$, nip roll 14 forces a portion of molten extrudate 13 into contact with one or more structural features (not shown) on the outer surface 16 of tool roll 15. In the present embodiment, outer surface 17 of nip roll 14 is smooth and in some embodiments is coated with a conformable material (e.g., a silicone or EPDM). As nip roll 14 and tool roll 15 rotate, outer surface 17 of nip roll 14 rotationally advances into and then away from molten extrudate 13. As the extrudate 13 advances beyond the nip, it begins to harden (e.g., at about point $P_B$). By about point $P_C$, molten extrudate 13 is substantially hardened as it then comes into contact with conveyer roll 18 rotating in a direction as noted by arrow $A_3$. At point $P_D$, substantially hardened molten extrudate 13 separates from tool roll surface 16 of tool roll 15 and proceeds in a direction as noted by arrow $A_4$ along outer surface 19 of conveyer roll 18 The hardened extrudate is now a continuous web of structured film 20 having one or more structural features 21. The film 20 may be further processed in a manner know by those of ordinary skill in the art.

Figure 2:
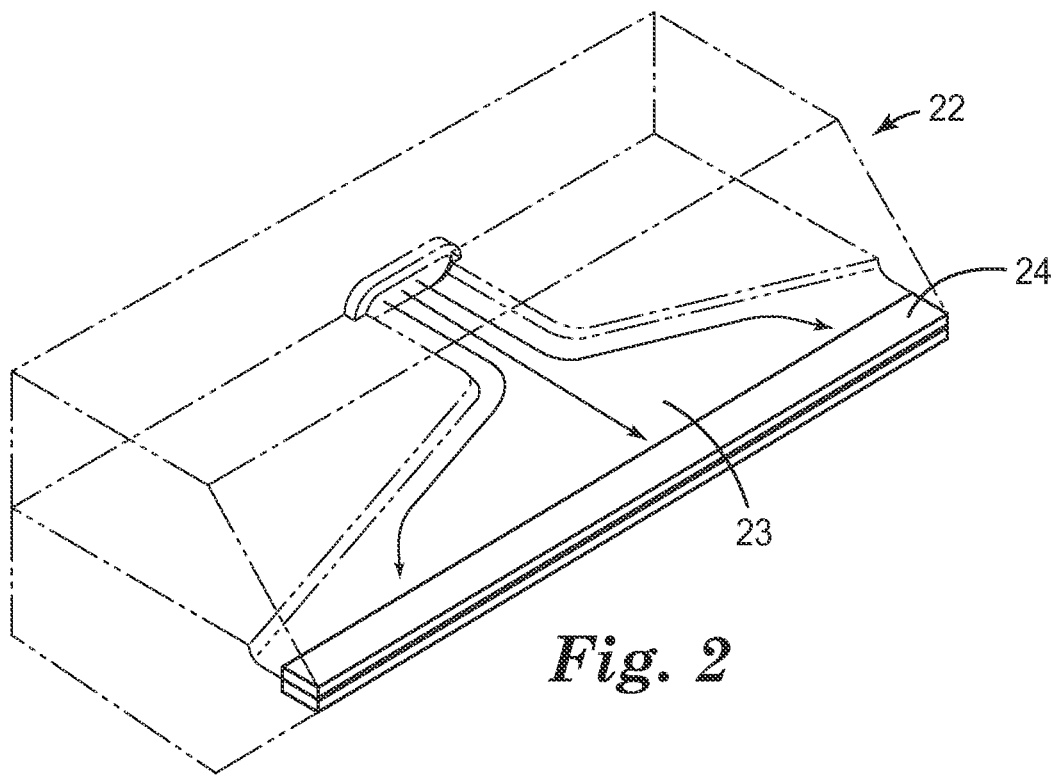
FIG. 2 is a cutaway perspective view of a die having a die insert such as used in the disclosed apparatus.
Figure 3:
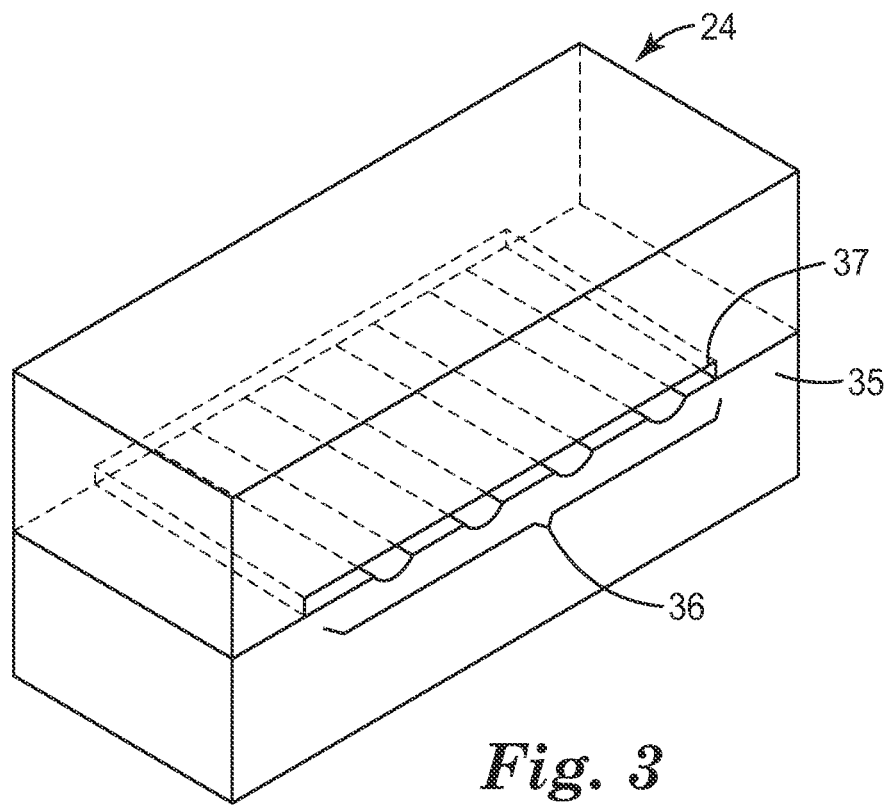
FIG. 3 is a perspective view of a die insert used to form a film in accordance with the disclosed apparatus viewed from the die insert exit.
Figure 15:
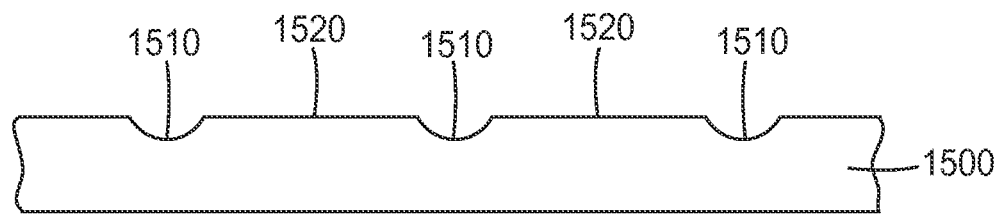
FIG. 15 is a partial view of a profiled die lip according to the current disclosure.

FIG. 2 schematically illustrates an embodiment of an extrusion die 22 of the type used in a method for forming a profiled extrudate of the current description. Generally, the various embodiments of the method of the present invention include extruding an initial melt stream 23 through a profiled extrusion die insert 24, as shown in FIG. 3. In some exemplary configurations, profiled extrusion die insert 24 has at least one profiled die lip 35 having die lip profile features 36. Profiled die exit opening 37 is non-rectilinear, meaning that exit opening 37 as a whole is in a form other than a rectangular shape; however, portions of profile die exit opening 37 could be rectilinear in form. Features 36 on profiled die lip 35 can be made by milling, machining, grinding, electron discharge machining or any other suitable method. Die insert 24 may be removed and replaced by a die insert of a different profile, if desired. It will be understood that the profiled die exit opening 37 may have a variety of shapes, to accommodate extrudate profiles of different configurations. Referring to FIG. 15, a front elevational view of a portion of a die lip 1500 is shown. The die lip 1500 is similar to the die lip 35 discussed above, wherein die lip 1500 has a profile that is a combination of non-rectilinear portions 1510 and rectilinear portions 1520.

Although the profiled die insert is shown in the embodiment discussed above as a separate element located within the die, those of ordinary skill in the art will appreciate that the profiled die insert could also be formed integrally with the die in which it is located as long as it has the profile features described.

Figure 4:
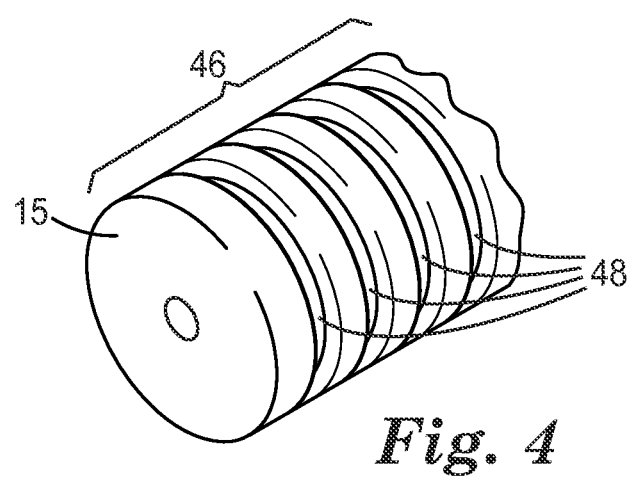
FIG. 4 is a perspective view of a structured roll showing grooved features.

FIG. 4 shows a schematic representation of an end portion of one embodiment of a tool roll 15 having an outer surface 46 and one or more structural features 48. It should be understood that the tool roll surface may have structural features 48 other than the simple grooves shown, and may include features such as grooves, ridges, or geometric shapes. It will also be understood that a tool surface could also be on an endless belt or other continuous surface having one or more structural features 48. In the embodiment shown, structural features 48 in the tool surface are provided to form features 21 in the structured film.

Methods for extruding films or articles are known in the art and are further described in U.S. Published Patent Application No. 2006/0147686 (Ausen et al.) and U.S. Pat. No. 5,232,777 (Sipinen et al.), the entire disclosures of which are incorporated herein by reference. Generally, the material from which the profiled extrudate of the present description is formed is such that when it is hot it is substantially pliable and/or formable, but once cooled it retains a selected configuration. Because the resin material of the present description is extrudable when hot, it may be extruded through a profiled extrusion die, i.e. a die having an outlet that is of a selected configuration to impart a predetermined shape or "profile" to the material extruded therethrough.

The profile imparted to the molten extrudate 13 is partially determined by a profile incorporated into the die lip. The profile can be substantially planar on one surface, or may have structures on both surfaces. The structures on either surface may be positioned at any location across the width of the extrudate. The structures on the extrudate profile may have individual structures separated by planar surface regions, or may have a series of features in close proximity across the width of the extrudate. Furthermore, multiple structures may be positioned close together and can be considered as a single larger structure for some embodiments. The structures may have any desired geometry and size as long as it is conducive to being formed by way of flow of the resin material through the die profile.

Figure 5:
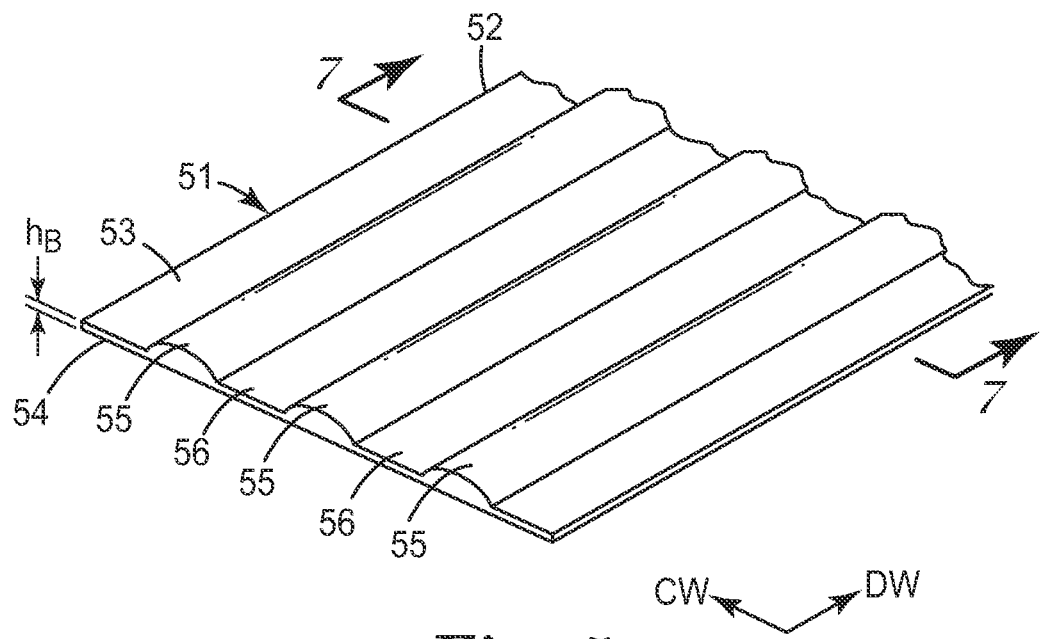
FIG. 5 is a fragmentary top perspective view of a molten extrudate of the current invention, showing structural features on a first major extrudate surface.
Figure 6:
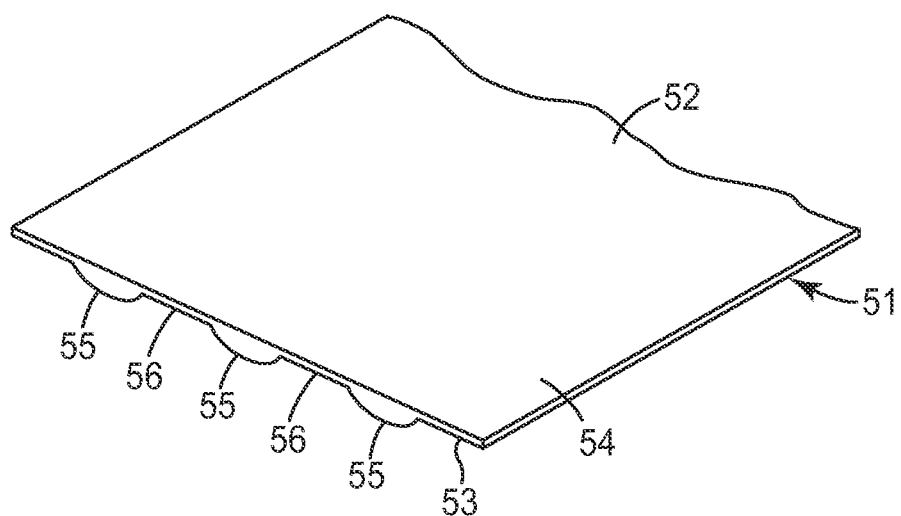
FIG. 6 is a fragmentary bottom perspective view of the arrangement shown in FIG. 5.
Figure 7:
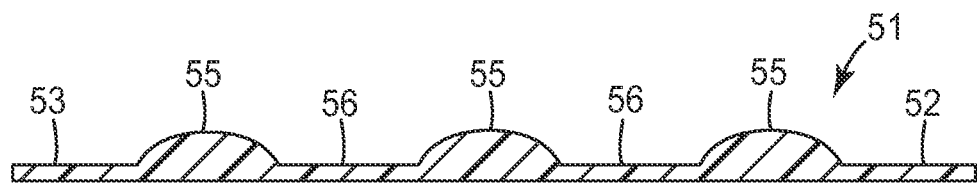
FIG. 7 is a cross-sectional view taken generally along the line 7-7, FIG. 5.

FIGS. 5-7 illustrate various views of a non-limiting embodiment of a molten extrudate of the current invention. Referring to FIG. 5, the reference numeral 51 generally designates a molten extrudate. Molten extrudate 51 is configured in a particular structure that comprises an extrudate base 52 which is substantially planar and has an average base thickness $h_B$ and first and second major extrudate surfaces 53 and 54 respectively. In the embodiment shown, molten extrudate 51 is unitary in construction; that is, it is formed in one piece and does not contain any pattern of holes or apertures therein. Other embodiments of extrudate 51 may comprise more than one layer of material, resulting from a co-extrusion process to be described below.

For the embodiment shown in FIGS. 5-7, first major extrudate surface 53 comprises a plurality of first structural features, or thick zones, 55. First structural features 55 are spaced from one another by substantially continuous thin zones or areas 56. Thin zones 56 have a thickness, which in the embodiment shown in FIGS. 5-7 is substantially the same as an average base thickness $h_B$ of the molten extrudate. Thick zones 55 and thin zones 56 are interspersed across the width of molten extrudate 51. The widths of thick zones 55 and thin zones 56 are predetermined so as to enable the formation of corresponding structural features (e.g., features 21 in FIG. 1) along a first major surface of a structured film such as the film 20, for example.

It is noted that the shape of first structural features 55 of the embodiment in FIGS. 5-7 is shown as generally rounded, corresponding to a semi-oval, or semi-circular arrangement. It will be understood that a variety of shapes may be utilized. For example, in FIG. 8, a cross-section of an embodiment is illustrated wherein the thick regions 85 have a generally square cross-section and are separated by thin zones 86. From a comparison of FIGS. 7 and 8 it will be understood that a variety of cross-sectional shapes can be provided. Each type of cross-section shown may have an advantage for particular applications.

Figure 9:
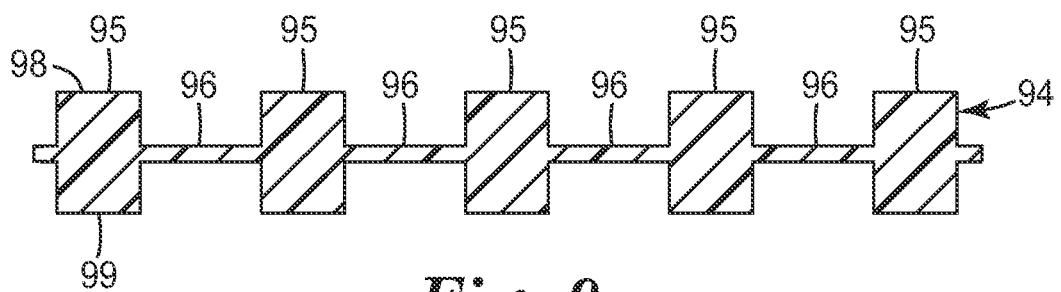
FIG. 9 is a cross-sectional view of another alternate embodiment of a molten extrudate of the current invention.

In FIG. 9, an embodiment of a molten extrudate is shown that differs significantly from the previous figures, in that structural features 95 project in both directions (here shown as up and down) from base 92. The features projecting form both sides of the base may or may not be aligned with each other or have any relationship in terms of size, geometry, location, number or other factor. Such an arrangement may be preferred, in some situations, for structured films where a property such as enhanced stiffness, for example, may be desirable.

Figure 8:
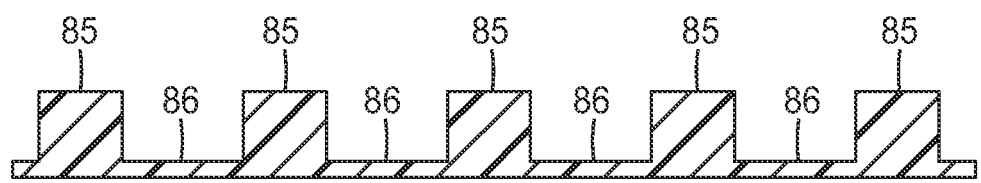
FIG. 8 is a cross-sectional view of an alternate embodiment of a molten extrudate of the current invention.

For the embodiments shown in FIGS. 7, 8 and 9, all of the structural features in a given embodiment are shown as having substantially identical cross-sectional areas. It will be understood that such is not required, and thick regions having different areas of cross-section, and indeed different overall shapes, may be provided. For example, in some embodiments, a combination of various thicknesses of thick regions across the width of molten extrudate may enable enhanced fine control of the degree of film stiffness in structured film.

A wide range of average base thicknesses can be used, for example average base thicknesses in a non-limiting range of 25 µm to 600 µm may be used, including ranges of 50 µm to 400 µm, and 100 µm to 200 µm.

Heights of structural features can be in a non-limiting range of 25 µm to 2000 µm, including ranges of 50 µm to 500 µm, and 100 µm to 250 µm.

The ratio of the height of structural features to an average base thickness can be in a non-limiting range of 0.1:1 to 5:1, including ratios of 0.5:1 to 2:1, and 1:1 to 1.5:1.

The geometry of the profile can be closely matched to the geometry of the profile in the tool roll, or may be significantly different. The precise geometry of the extrudate profile that contacts a tool roll (e.g., tool roll 15 in FIG. 1) will be affected by a number of factors including material rheology, process conditions such as extruder throughput rate and the rate at which the extrudate is drawn from the die, among others. It will also be affected by the geometry of the profile in the die opening. In particular, there may be swelling of the extrudate upon exiting the die opening, and rounding of sharp features such as in rectilinear profiles.

Resin may be fed into the profiled die 12 by an extruder (not shown) that may be a single screw or a twin screw extruder. A single type of resin can be extruded through profiled die 12, or alternatively, two or more types of resin can be coextruded to form an extrudate with multiple layers. A process for producing co-extruded polymeric materials is described in U.S. Pat. No. 6,489,003 (Levitt et al.), the entire disclosure of which is incorporated herein by reference. Co-extrusion can occur by passing different melt streams from different extruders into (1) a multiple slotted feed block and then into a single layer film die or (2) a multiple manifold die. In the multiple slotted feed block technique, at least two different materials are fed from different extruders into different slots (usually 2 to over 200) in a feed block. The individual streams are merged in the feed block and enter a die as a layered stack that flows out into layered sheets as the material leaves the die. The multiple manifold die combines the different molten streams from different extruders at the die lip. This method is usually limited to 2-3 layered films because of the increased complexity as the number of layers is increased.

In cases of co-extrusion, interlayer adhesion may benefit from including one or more reactive species into the layers to create a reactive tie layer at the interface or by incorporating into the construction separate layers that have affinities to both principal layers, as described in U.S. Pat. No. 6,489,003 (Levitt et al.), the entire disclosure of which is incorporated herein by reference.

Molten extrudate 13 emerging from profiled die 12 is passed through a nip. In some exemplary configurations, the nip comprises a smooth press roll and a structured roll having a structure on the surface thereof, or both the press roll and tool roll may have structure on their surfaces. Alternatively, one or both of the nipping surfaces may be on an endless belt or other continuous surface configuration. An example of a process for producing a film using an endless belt is described in U.S. Pat. No. 5,204,037 (Fujii). The molten extrudate 13 emerging from profiled die 12 is sufficiently molten to fill the spaces within structures present on the rolls at the nip, while also having sufficient melt strength or modulus to substantially retain the cross-sectional profile generated by extrusion through the profiled die, up until the extrudate passes into the nip.

Press roll 14 can be made of metal, e.g. steel such as stainless steel, or aluminum, or any other appropriate material. Press roll 14 can have a diameter of, for example, from about 20 cm or less to about 60 cm or more. Press roll 14 may have a plated surface 17 formed with, e.g., chromium, copper, nickel, nickel-phosphorous plating, or any other serviceable plating, or the press roll may have a conformable surface layer (e.g., silicone or EPDM). Outer surface 17 on press roll 14 can have a mirror finish, or can have a structured surface. The roll is typically cooled with water or other fluid. In some embodiments, outer surface 17 of press roll 14 may comprise structural features (not shown), so that structured film 20 has features on both major surfaces. An example of the type of cross-section that can be made by this process is that shown in FIG. 9.

Tool roll 15 can be made of metal, e.g. steel such as stainless steel, or aluminum, or any other appropriate material. Tool roll 15 can have a diameter of for example, from about 20 cm or less to about 60 cm or more. Tool roll 15 may have a plated surface formed with, e.g., chromium, copper, nickel, nickel-phosphorous plating, or any other serviceable plating. In the various embodiments described herein, tool roll 15 typically is provided with a structured surface. Tool roll 15 can transfer its structured surface profile to structured film 20 so that structured film 20 possesses a surface profile complementary to that of the tool roll 15. The tool roll may have an outer layer, such as a metal sleeve or laminated coating that contains the structural features to be replicated.

Various known methods can be used for providing structured surface 16 on tool roll 15, include various combinations of engraving, diamond turning, and other techniques known in the art.

The structural features on structured roll 15 may comprise one or more features with geometries including, but not limited to, rails, prisms, wedges, lenses, wells, posts. It is generally preferred that the features on the structured roll are oriented in down-web dimension, though they need not be linear, as shown in embodiments in FIG. 13A and FIG. 14 where the structural features have a sinusoidal pattern oriented in a down-web dimension. There may additionally be features with some portions oriented in a cross-web dimension.

In some embodiments, the structural features in tool roll 15 are continuous, non-interrupted features in the down-web dimension, such that there is a steady consumption of resin into the tool surface features matching the steady volume of the extrudate features. In other embodiments, discontinuous tool surface features may be provided on the surface 16 of tool roll 15. Discontinuous structures may include individual wells, for example, resulting in compact protrusions along the finished surface of the structured film 20.

Suitable materials for use as resin material generally include any of a variety of materials that can be heated into a flowable melt and resolidified into a film. The following are examples of resin material: thermoplastic polymers such as polyethylene, polypropylene, polystyrenes, polymethylmethacrylate, polyamide, polyester, polycarbonate, polymethyleneoxide, polybutyleneterephthalate as well as copolymers such as styrene acrylonitrile copolymers, styrene (meth) acrylate copolymers, styrene maleic anhydride copolymers, nucleated semi-crystalline polyesters, copolymers of polyethylenenaphthalate, polyimide copolymers, polyetherimide, polyethylene oxides and copolymers of acrylonitrile, butadiene, and styrene and blends of these materials with each other as well as other resins.

In some embodiments, molten resin may be extruded at a temperature of approximately 250° Celsius or at a temperature within the range from about 200° to about 300° Celsius. The actual temperature of the extrudate is chosen to be appropriate for that particular resin.

Resin may contain additives such as, but not limited to, powders such as fumed silica, talc, or clay; magnetic, electrically conductive, thermally conductive, electrically and thermally conductive, or nonconductive particulates; fibers; glass or polymeric hollow microspheres, glass or polymeric solid microspheres, expandable polymeric microspheres, antistatic agents, lubricants, wetting agents, flow control agents, tackifying resins, surfactants, pigments, dyes, colorants, coupling agents, plasticizers, and antioxidants; a light diffusion agent, a UV absorber, a thermal stabilizer, filler, and an antistatic agent.

Figure 10A:
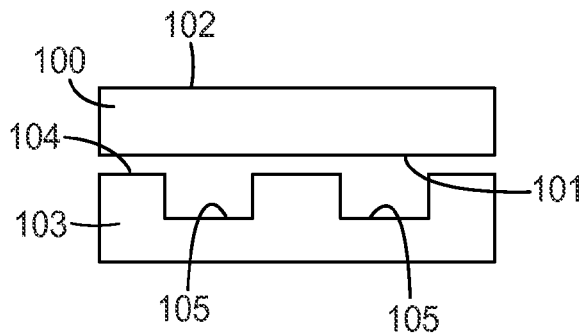
FIGS. 10A and 10B are a schematic representation showing a prior art of extrusion replication of large features in a thin film.
Figure 10B:
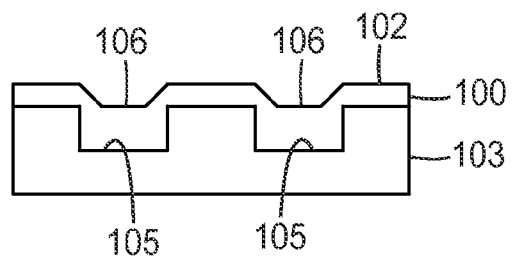

As described herein, the various embodiments of the invention utilize a profiled die that provides an extrudate having a molten profiled configuration that includes sufficient material to fill the features on the surface of a structured tool roll. Typically, the molten extrudate includes opposing major surfaces that are neither planar nor parallel with one another. Referring to FIG. 10A, a standard prior art extrusion replication situation is illustrated where a molten extrudate 100 has opposing major surfaces 101 and 102 which are substantially planar, such that the major surfaces of the molten extrudate can be regarded as being substantially flat or nearly parallel with one another. Molten extrudate 100 is shown in proximity to a structured tool 103, having a tool surface 104 that includes structural features 105. FIG. 10B illustrates what can potentially happen when substantially flat extrudate 100 is pressed into contact with structured tool 103. As a result of insufficient material in the extrudate 100, a major surface 102 of the extrudate 100, as well as the resulting finished film, includes depressions 106, resulting from a flow of molten extrudate 100 into features 105 on the tool surface. When the size of structural features 105 is small compared to the thickness of substantially flat molten extrudate 100, a flow of molten extrudate to fill in structural features 105 may result in only slight depressions 106. This effect is somewhat less pronounced in processes utilizing a tool surface with very shallow structural features.

In another embodiment (not shown), molten extrudate is allowed to form a "pool" of molten material at the entrance to a nip comprising at least one structured tool surface. In such an embodiment, the amount of molten material in the "pool" is maintained at a predetermined volume or mass to prevent the pool from getting too low and incompletely filling the depressions in the structured tool surface.

The methods described herein are useful for making a variety of replicated films 20 where it is helpful to minimize the flows within extrudate 13 during the filling of features on a structured roll surface. By providing a profiled extrusion die 22 having features in cross-web alignment with a structured surface on at least one structured roll 15, a profiled extrudate may be obtained that has a defined variability in caliper along the cross-web dimension, wherein that defined variability in caliper is aligned with a defined cross-web variability of features on the structured surface. The cross-web alignment of extrudate caliper with the structured surface on a structured roll may minimize the need for extrudate material to flow into the depressions or away from ridges, in contrast to the flows that would result from applying a substantially flat extrudate to the structured surface. By tailoring the cross-web caliper of the extrudate, improved control in the cross-web caliper of the replicated film article may be obtained.

Figure 11A:
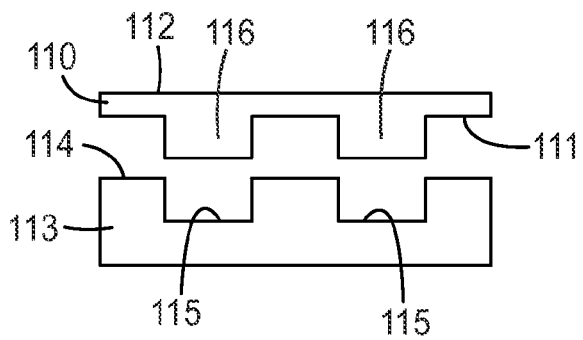
FIGS. 11A and 11B are a schematic representation showing the coordination of structural features on an extrudate with structural features on a tool surface.
Figure 11B:
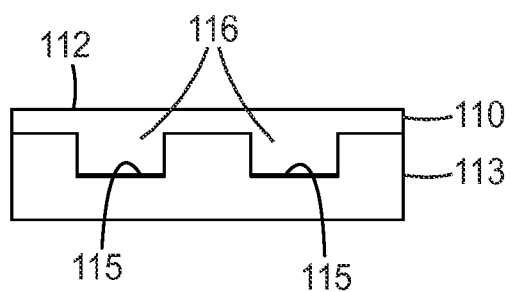

FIG. 11A shows an embodiment of the invention wherein molten extrudate 110 has first major extrudate surface 111 and second major extrudate surface 112, the first major extrudate surface 111 having first structural features 116. Molten extrudate 110 is positioned in proximity to a structured tool 113, having a tool surface 114 that includes one or more second structural features 115. In FIG. 11B, molten extrudate 110 is shown after being brought into contact with tool surface 114 so as to cause a portion of first structural feature 116 to contact a second structural feature 115 on the tool surface. In a subsequent step (not shown), molten extrudate 110 is cooled and can be removed from the structured tool 113 to provide a structured film 20.

In FIG. 11A, structural features 115 and 116 are each shown as being rectilinear, with 90-degree corners; however, the structural features may deviate from rectilinear, to include a variety of geometries capable of being aligned and then pressed or nipped together during a replication step and subsequently being able to be released. For example, structural features 115 and 116 may have corners that are slightly rounded.

Typically, for an extrudate having structural features on only one major surface and a nip with a press roll having a substantially smooth surface and a tool roll with features on its surface, it is desirable for the cross sectional area of the extrudate features to be similar to, but not necessarily the same as, the cross sectional area of the tool feature or features to which it is aligned. Doing so will result in a film having a first surface with structures, and a substantially planar second surface, as in FIG. 12A-C.

Figure 12A:
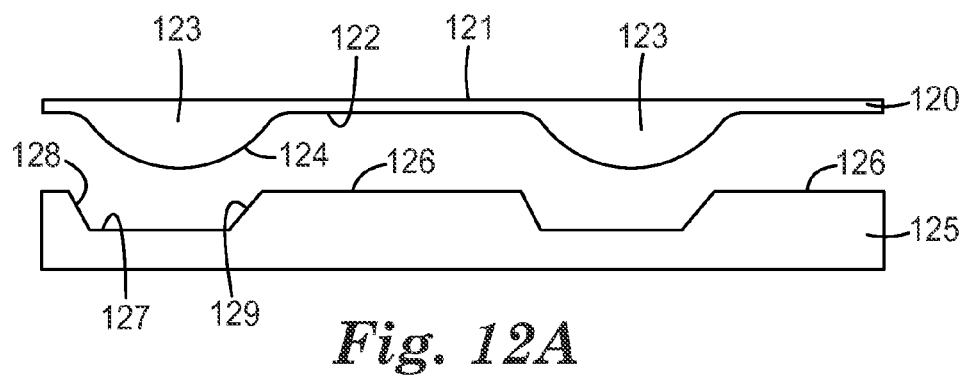
FIG. 12A-D show an embodiment of the replication process of the invention.

FIG. 12A shows an embodiment of the invention wherein a molten extrudate 120 has major surfaces 121 and 122, and has a profile similar to the example given in FIG. 7, and oriented here to align thick zones 123 of the molten extrudate with structural features in a tool 125, shown here in profile and having surfaces 127, 128, and 129 that define structural features in tool surface 126. Molten extrudate 120 is brought into contact with the tool surface so as to cause a portion of structural features 123 on major extrudate surface 122 to contact the structural features in the tool surface, as shown in FIG. 12C. Molten extrudate 120 is cooled and then removed from the tool surface, to provide the structured film 200 which has structural features 130, defined by surfaces 137, 138, and 139, as shown in FIG. 12D. It will be understood that tool surface 126, which may be on a tool such as tool roll 15, may comprise additional, smaller features (not shown) that may be useful in providing additional, smaller features to the structured film in "thin zone" 122.

Figure 12B:
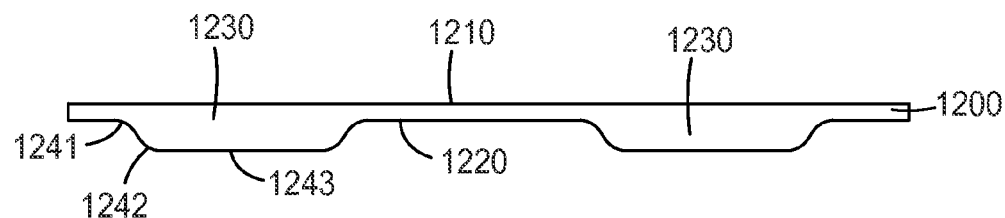
Figure 12C:
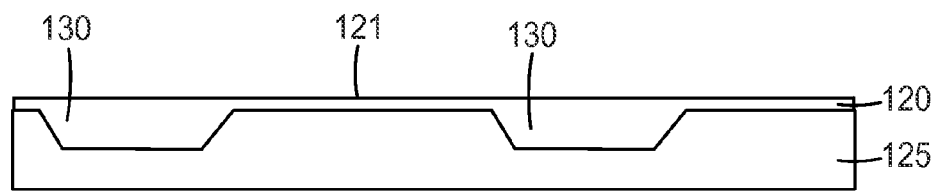
Figure 12D:
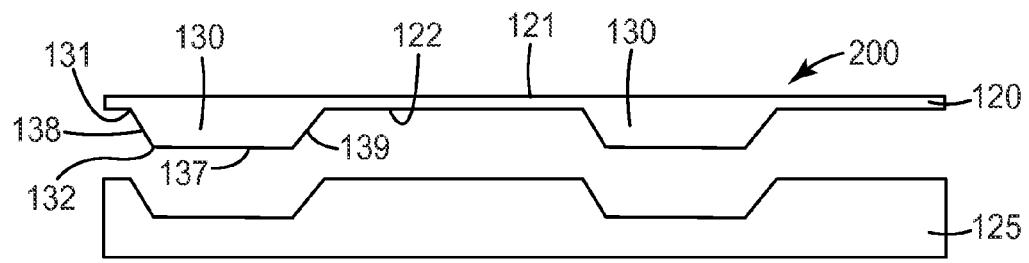

In some embodiments, the molten extrudate can have a profile closely matched to the geometry of the one or more structural features in the tool surface, such as structural features 1230 in extrudate 1200 shown in FIG. 12B. In a non-limiting embodiment, extrudate 1200 has major extrudate surfaces 1210 and 1220, and structural features 1230 having corners 1241 and 1242, here shown as rounded corners. In other embodiments, either or both of these corners 1241 and 1242, or other corners on the extrudate surface, may be more rounded or less rounded, or the corners may be sharp, as may be desirable for some embodiments.

In some embodiments, it may be desirable for a cross-sectional area of extrudate features to closely match a cross-sectional area of tool surface features. In some embodiments, a ratio of a cross-web cross-sectional area of the first structural feature to a cross-web cross-sectional area of a second structural feature is about 1.0. For example, FIG. 12A shows first structural feature 123 that may have a cross-web cross-sectional area that is similar to the cross-web cross-sectional area of the structural feature defined by surfaces 127, 128, and 129 in the surface of tool 125.

In some embodiments of the invention, it may be desirable for a cross-sectional area of the extrudate features to be greater than a cross-sectional area of a tool surface feature (or features), in which case contacting a portion of the extrudate structural feature with the tool surface feature (or features) results in a film with a thicker base caliper in specific cross-web regions results. In this type of embodiment, it may be desirable for the press roll to have a conformable surface, in order to allow for the flow of molten extrudate to protrude beyond a substantially planar surface of the extrudate opposite the surface that is in contact with the tool roll.

Figure 13A:
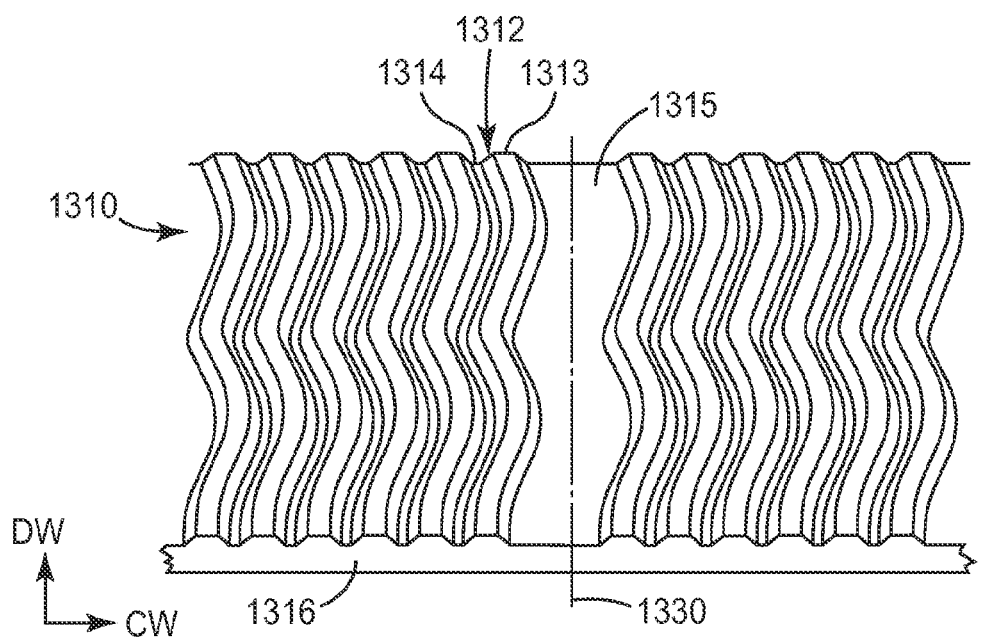
FIG. 13A-C shows an embodiment of an article of the current disclosure having sinusoidal grooves.
Figure 13B:
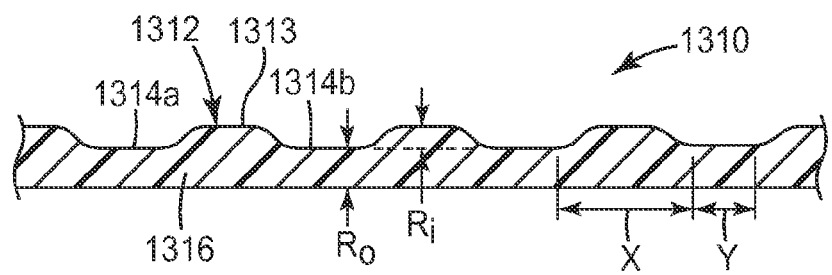

In FIGS. 13A and 13B, an embodiment of structured film 1310 is shown, having grooves 1312 on a major surface thereof "Grooves" here may include ridges 1313 and valleys 1314. In some embodiments of structured film 1310, and as shown in FIG. 13A, there may be a combination of grooved regions and "ungrooved" (i.e., substantially flat) regions 1315. In FIG. 13A, grooves 1312 have a sinusoidal pattern.

FIG. 13B shows a partial cross-sectional view perpendicular to axis 1330, showing floor or base 1316 and at least one groove 1312 that comprises ridge 1313 and valleys 1314a and 1314b flanking either side of ridge 1313. Valleys 1314a and 1314b have a base thickness $R_0$, and width Y, and ridge 1313 has height $R_i$ and width X, X as shown in FIG. 13B is about twice the width of Y, although other ratios could be selected. The relative dimensions $R_0$, $R_i$, X, and Y may be varied according to the properties desired in structured film 1310. For example, in some embodiments, it may be desirable for structured film 1310 to have a degree of stiffness resulting from a selection of X to be about twice the width of Y.

Figure 13C:
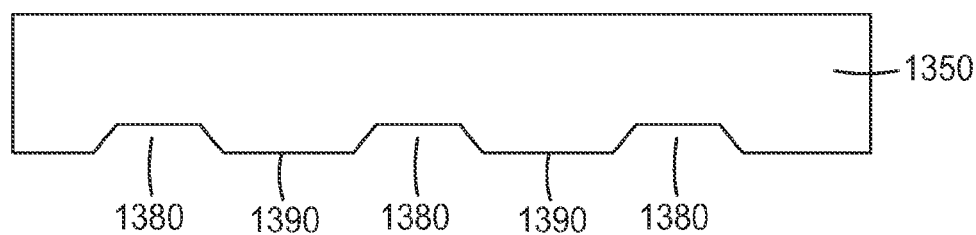
Figure 14:
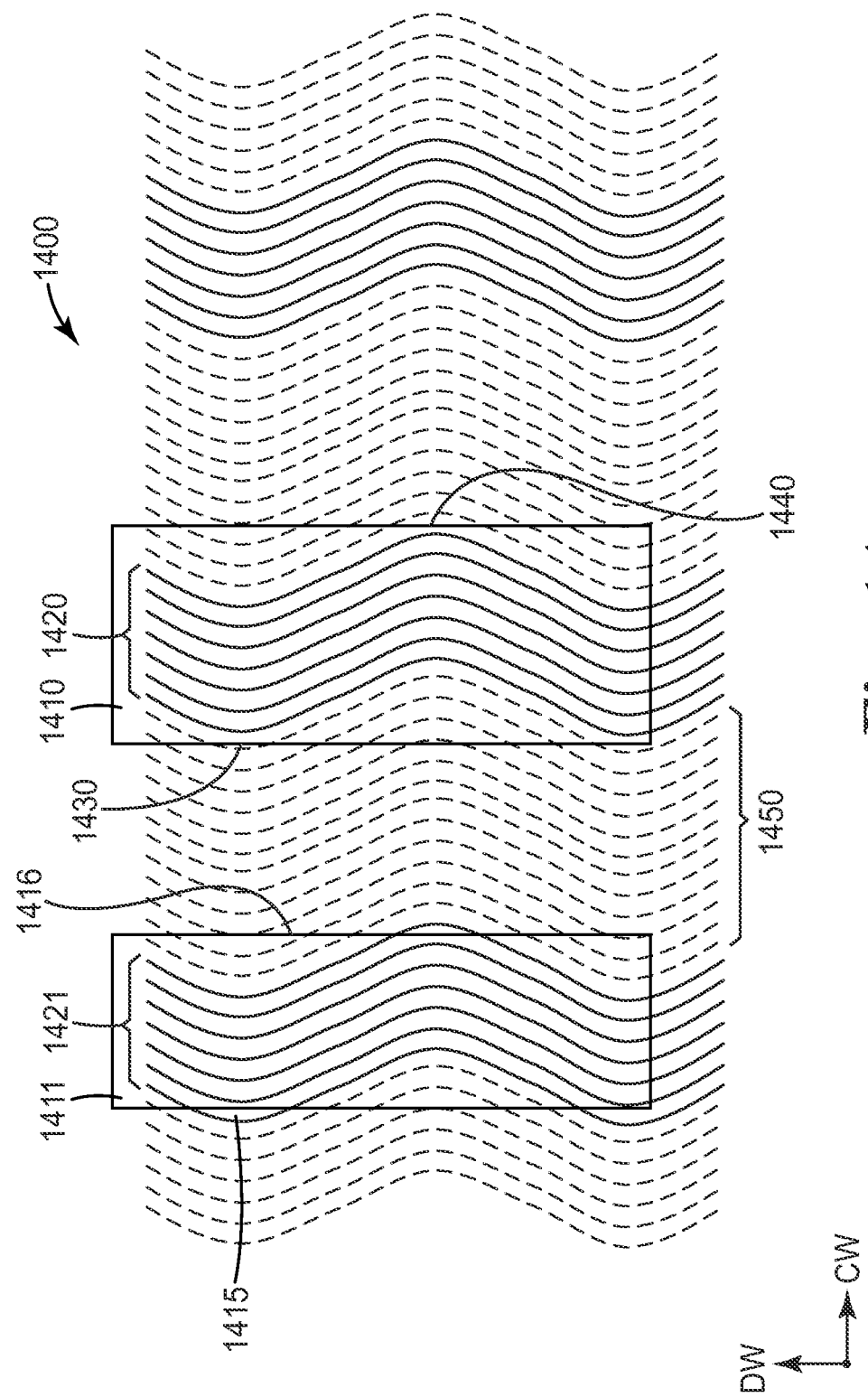
FIG. 14 is a top view of a sinusoidal groove pattern in a web according to an embodiment of the current disclosure.

To explain how structured film 1310 might be produced, reference is made to FIG. 14, which shows schematically a view of tool surface 1400 from a perspective orthogonal to the cross-web (CW) and down-web (DW) dimensions. Extrudate region 1410 is shown contacting a set of sinusoidal tool surface structures 1420 in a manner that overlaps the solid lines 1420, which here represent depressions in the tool surface that are the negative of grooves 1312 in FIG. 13A. The broken sinusoidal lines 1450 in FIG. 14 represent shallower depressions that may optionally be present in the tool surface. Extrudate region 1410 can be formed by extrusion over a profiled die lip, for example the profiled die lip shown schematically in FIG. 13C, having non-rectilinear portion 1380 and rectilinear portion 1390. The dimensions of 1380 may be selected to form an extrudate feature having sufficient width and volume to fill tool surface features 1420. In this case, each die lip feature 1380 may have a width to form an extrudate feature that contacts the tool surface from edge 1430 to edge 1440. In another embodiment, die lip feature 1380 may be selected to generate extrudate feature 1411 having a width that is narrower than the overall width of the set of sinusoidal tool surface depressions 1421, as schematically shown at points 1415 and 1416.

EXAMPLE

Additional embodiments and features thereof are set for the in the following non-limiting Example.

A structured replicated film having surface structure similar to that shown in FIG. 13A was prepared using a copolyester polymer (Eastar PETG 6763 obtained from Eastman Chemical Co., Kingsport, Tenn.) and the following procedure. A 32 mm (24 L/D) 4-zone single screw extruder (11 RPM) was used to melt and extrude the PETG polymer into a 20 centimeter wide conventional coat-hanger film die equipped with two removable die lips. One of the die lips was shaped to have a profile like that shown in FIG. 13C using conventional wire EDM (electron discharge machining) techniques. The first zone of the extruder was water-cooled at approximately 25° C. The second zone of the extruder was set at 210° C. while the remaining zones were set at 180° C. The die temperature was maintained at 170° C. The melt temperature of the polymer in the die was 246° C. The molten polymer was extruded through the profiled die lip and vertically downward into a nip configured with a 32 cm diameter temperature controlled steel tool roll (52° C.) on one side and a 32 cm diameter chill (24° C.) roll (having a silicone rubber coating) on the opposite side. The steel roll was fitted with a structured aluminum sleeve which had been machined with a series of sinusoidal grooves around the roll complementary to the surface structure of the film surface shown in FIG. 13A. A nip force of 3200 N per lineal cm was used. The profiled die lip was positioned such that the shaped side of the extrudate contacted the grooves on the surface of the tool roll, and the profiles in the extrudate were aligned with the appropriate grooves in the tool roll. The extrudate was in contact with the tool roll for approximately 180 degrees of wrap on the roll. The film was pulled from the tool roll at 5.5 meters/min using a driven peel-off rubber coated roll that was slightly oversped relative to the tool roll speed.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A process for making a structured film, comprising steps of:
   (a) extruding a molten material through an extrusion die having at least one profiled die lip to form a molten extrudate having first and second major extrudate surfaces and having a first structural feature in the first major extrudate surface;
   (b) bringing the molten extrudate into contact with a tool surface comprising one or more second structural features so as to cause a portion of the first structural feature in the first major extrudate surface to contact at least one of the second structural features on the tool surface; and
   (c) cooling the molten extrudate to provide the structured film;
   wherein a ratio of a cross-web cross-sectional area of the first structural feature to a cross-web cross-sectional area of a second structural feature is about 1.0.

2. The process of claim 1 wherein extruding a molten material comprises extruding the molten material vertically downward and into contact with the tool surface.

3. The process of claim 1, wherein extruding a molten material comprises extruding at least one of a polyolefin, an olefin-containing polymer, or combinations of two or more of the foregoing.

4. The process of claim 1, wherein extruding a molten material is performed using a single screw extruder.

5. The process of claim 1, wherein extruding a molten material is performed using a twin screw extruder.

6. The process of claim 1, wherein extruding a molten material comprises extruding at least one of polyethylene, polypropylene, polystyrene, polymethylmethacrylate, polyamide, polyester, polycarbonate, polymethyleneoxide, styrene acrylonitrile copolymer, styrene (meth)acrylate copolymer, styrene maleic anhydride copolymer, polyimide copolymer, polyetherimide, polyethylene oxide, or combinations of two or more of the foregoing.

7. The process of claim 1, wherein extruding a molten material comprises extruding at least one of cyclic olefin copolymers, polyethylene naphthalate, polyethylene terephthalate, polyacrylate, polymethylmethacrylate, polycarbonate, polymethylpentene, styrene acrylonitrile, polymer, or combinations of two or more of the foregoing.

8. The process of claim 1, wherein bringing the molten extrudate into contact with a tool surface in step b) comprises nipping the molten extrudate between the tool surface and a nip roll, wherein the tool surface is a surface on a tool roll.

9. The process of claim 8 wherein at least one of the nip roll or the tool roll is cooled.

10. The process of claim 1, wherein bringing the molten extrudate into contact with a tool surface in step b) comprises nipping the molten extrudate between the tool surface and a nip roll, wherein the tool surface is a surface on an endless belt.

11. The process of claim 1, wherein bringing the molten extrudate into contact with a tool surface in step b) comprises nipping the molten extrudate between the tool surface and a nip surface, wherein the nip surface is a surface on an endless belt.

12. The process of claim 1 wherein step b) occurs at a temperature above a glass transition temperature of the molten extrudate.

13. The process of claim 1 wherein the portion of the first structural feature contacts at least two of the second structural features located on the tool surface.

* * * * *

UNITED STATES PATENT AND TRADEMARK OFFICE
CERTIFICATE OF CORRECTION

| | |
|---|---|
| PATENT NO. | : 9,108,349 B2 |
| APPLICATION NO. | : 13/636278 |
| DATED | : August 18, 2015 |
| INVENTOR(S) | : Clarke et al. |

Page 1 of 1

It is certified that error appears in the above-identified patent and that said Letters Patent is hereby corrected as shown below:

In the specification

<u>Column 1</u>
Line 10, delete "disclosure" and insert -- disclosures --, therefor.

Signed and Sealed this
First Day of March, 2016

Michelle K. Lee
*Director of the United States Patent and Trademark Office*